3,360,480
PROCESS FOR PREPARING YTTRIUM
VANADATE PHOSPHORS
Joseph S. Martin, Jr., and Stephen S. Trond, Lancaster, Pa., assignors to Radio Corporation of America, a corporation of Delaware
No Drawing. Filed Mar. 16, 1965, Ser. No. 440,320
1 Claim. (Cl. 252—301.4)

ABSTRACT OF THE DISCLOSURE

Methods for preparing phosphors comprising coprecipitating vanadates of europium, and yttrium and/or gadolinium from an aqueous solution and then, after drying, heating the coprecipitate with a suitable flux to produce phosphor particles of small average size and improved cathodoluminescence brightness. By one feature, the coprecipitation step is conducted in an aqueous ammonium nitrate solution to produce a crystalline coprecipitate. By another feature, the flux contains an excess of $Na_2CO_3$ which increases the brightness from and decreases the discoloration of the phosphor.

---

This invention relates to an improved process for preparing a europium-activated vanadate phosphor, which is particularly useful in kinescopes for color television.

A europium-activated yttrium vanadate phosphor and its preparation have been described previously in U.S. Patent No. 3,152,085, to A. A. Ballman et al. Such previous phosphor is described as being particularly adapted for use in laser systems. In this use, the phosphor is optimized so as to produce coherent light by stimulated photoluminescence in large crystals of the phosphor.

An object of this invention is to provide a process for preparing a europium-activated vanadate phosphor which is particularly adapted for use in cathode ray tubes, for example, in kinescopes for color television. In this use in kinescopes, the phosphor is optimized so as to produce non-coherent light by spontaneous cathodoluminescence in small particles of the phosphor.

In general, the process of the invention may be conducted by the following sequence of steps:

First, mix a first solution containing (a) soluble salts of Eu (europium) and (b) salts of Y (yttrium) and/or Gd (gadolinium), the molar ratio of Eu/Y+Gd being between 2/98 nad 9/91 in said first solution, with a second solution containing a soluble vanadate. In the mixture of solutions, the molar proportion of added V (vanadium) is about equal to the molar proportion Eu+Y+Gd. Upon mixing the solutions, vanadates of Eu and at least one of Y+Gd are coprecipitated. The coprecipitation is preferably conducted at about 80° C. and above.

Second, remove the coprecipitate from the mixed solution, as by centrifuging or filtering, and then dry the coprecipitate.

Third, mix the dry coprecipitate with 2 to 15 weight percent of a dry sodium vanadate flux. The flux may be $NaVO_3$ or a dry mixture of $Na_2CO_3$ and $V_2O_5$. Preferably, the flux is a dry mixture of $Na_2CO_3$ and $V_2O_5$ in which there is a 20 to 75 weight percent excess of $Na_2CO_3$ over what is required to produce $NaVO_3$ with the $V_2O_5$ present.

Finally, heat the dry mixture in air at temperatures between 1100 and 1300° C. for between 1 and 4 hours to form the phosphor. The heated mixture is cooled and then washed in warm water to remove the phosphor.

The object of the invention is achieved at least by coprecipitating the vanadates from a solution whereby on subsequent heating with a suitable flux, a solid state reaction takes place which produces phosphor particles of small average size having an improved cathodoluminescence brightness.

If the first and second solutions are mixed with one another directly, a coprecipitate is formed which may be gelatinous and may be difficult to remove from the mixed solution. This difficulty may be avoided by adding equal quantities of the first and second solutions to a third solution containing ammonium nitrate. The third solution is preferably the filtrate from a previous coprecipitation. Mixing the solutions in this manner produces a fine-grained crystalline coprecipitate that is easily filtered.

The invention is described in more detail in the following illustrative embodiments.

Example 1

The following embodiment exemplifies the coprecipitation process carried out by the direct addition of a vanadate solution to a solution of europium and yttrium salts.

(1) Suspend about 52.5 grams of $Y_2O_3$ and about 3.87 grams of $Eu_2O_3$ in 250 cc. of water.

(2) Dissolve the suspended oxides by slowly adding 94 cc. of concentrated nitric acid to the suspension produced in step 1, thereby producing a first solution comprising dissolved nitrates of yttrium and europium. Then, filter the first solution.

(3) Heat the filtered first solution of nitrates to about 80° C.

(4) Suspend about 42.2 grams of $V_2O_5$ in 1500 cc. of water.

(5) Heat the $V_2O_5$ suspension with stirring to at least 80° C.

(6) Add to the hot $V_2O_5$ suspension enough concentrated $NH_4OH$ to adjust the pH thereof to about 9, thereby dissolving the $V_2O_5$ and producing a second solution comprising $NH_4VO_3$ (ammonium vanadate).

(7) Add the hot second solution of vanadate to the hot first solution of nitrates to produce a mixed solution and to commence the coprecipitation of yttrium and europium vanadates.

(8) Adjust the pH of the mixed solution to about 7 to 8 by the addition of a suitable amount of ammonium hydroxide. Digest the mixed solution at temperatures of about 80° C. for about 15 to 30 minutes, whereby, the coprecipitation of yttrium vanadate and europium vanadate is completed.

(9) Remove the coprecipitate from the precipitating medium. Since the coprecipitate is gelatinous, it is preferably removed by washing in a centrifuge by any conventional technique until it is substantially free of ammonium nitrate.

(10) Dry the washed precipitate for about 24 hours at 150° C.

Example 2

This embodiment illustrates the coprecipitation process carried out by adding a vanadate solution and a solution of europium and yttrium salts to a third solution containing ammonium nitrate.

(1) Suspend about 52.5 grams of $Y_2O_3$ and about 3.87 grams of $Eu_2O_3$ in 250 cc. of water.

(2) Dissolve the oxides in the suspension by slowly adding 94 cc. of concentrated nitric acid to the suspension produced in step 1 thereby producing a first solution comprising dissolved nitrates of yttrium and europium. Then, filter the first solution and dilute the filtered solution to about 1500 cc.

(3) Heat the filtered and diluted first solution to about 80° C.

(4) Suspend about 42.2 grams of $V_2O_5$ in about 1500 cc. of water.

(5) Heat the $V_2O_5$ suspension to about 80° C. with stirring.

(6) Add to the heated $V_2O_5$ suspension enough concentrated ammonium hydroxide to adjust the pH thereof to about 9, thereby dissolving the $V_2O_5$ and forming a second solution comprising dissolved ammonium vanadate.

(7) Prepare a third solution comprising ammonium nitrate. The third solution can be, for example, the mother liquor (filtrate) from a previous precipitation, or it can be a 5% ammonium nitrate solution. The pH of the third solution is adjusted to a pH of 7 to 8 with ammonium hydroxide, and the adjusted third solution is heated to about 80° C.

(8) The first and second solutions produced at steps 3 and 6 of this example are slowly added at equal rates to the hot third solution which is maintained at about 80° C., to produce a mixed solution and to commence the coprecipitation of yttrium and europium vanadates. During the addition of the first and second solutions to the third solution, the pH of the mixed solution is monitored and adjusted to 7 to 8 by adding ammonium hydroxide as needed. And, the temperature of the mixed solution is also monitored and held at about 80° C.

(9) After the solution additions are completed, the mixed solution is digested for about 15 to 30 minutes, whereby the coprecipitation of europium vanadate and yttrium vanadate is completed.

(10) Filter the coprecipitate, which is crystalline, and wash the coprecipitate on the filter medium until it is free of ammonium nitrate.

(11) Dry the coprecipitate for about 24 hours at 150° C.

The product of either Example 1 or Example 2 is mixed with a sodium vanadate flux and then heated in air for 1 to 4 hours at about 1100 to 1300° C. to form the phosphor and then cooled. As used herein, a "sodium vanadate flux" means either $NaVO_3$, or mixtures of sodium carbonate ($Na_2CO_3$) and $V_2O_5$ which, on heating, produce $NaVO_3$. Where mixtures of $Na_2CO_3$ and $V_2O_5$ are used, it is preferred that the flux contain a 20 to 75 weight percent excess of $Na_2CO_3$ over what is required to form $NaVO_3$ upon heating. The proportion of flux (excluding the excess $Na_2CO_3$, if there is an excess), may be 2 to 15 weight percent of the dry coprecipitate used.

*Example 3*

An example of the use of 2 to 15 weight percent of $NaVO_3$ as the flux, is as follows. Mix 25 grams of the dry coprecipitate produced in Example 1 with 2.5 grams of $NaVO_3$ (10 weight percent) in dry form. Place the dry mixture in a quartz crucible, heat in air for about 1 hour at 1200° C., and then cool to room temperature. Remove the cooled material from the crucible and wash in warm water to dissolve soluble materials, leaving behind an insoluble phosphor powder product.

*Example 4*

An example of using 2 to 15 weight percent of $NaVO_3$ added as $V_2O_5$ and $Na_2CO_3$ is as follows. Mix in dry form 25 grams of the dry coprecipitate product in Example 2 with 1.86 grams of $V_2O_5$ and 1.09 grams of $Na_2CO_3$. Place the mixture in a quartz crucible, heat in air for about 1 hour at 1200° C., and then cool. Remove the cooled material from the crucible and wash in warm water to dissolve soluble materials, leaving behind an insoluble phosphor powder product.

*Example 5*

An example of using 2 to 15 weight percent of $NaVO_3$ added as $V_2O_5$ and $Na_2CO_3$ plus a 20 to 75 weight percent excess of $Na_2CO_3$ is as follows. Mix in dry form 25 grams of the dry coprecipitate produced in Example 2 with about 1.86 grams of $V_2O_5$ and 1.64 grams of $Na_2CO_3$ (50% excess of $Na_2CO_3$). Place the mixture in a quartz crucible, heat in air for about 1 hour at 1200° C., and then cool to room temperature. Remove the cooled material from the crucible and wash in warm water to dissolve soluble materials, leaving behind an insoluble phosphor powder product.

The products of Examples 3, 4, and 5 are very similar. Each has the approximate molar composition $Y_{0.95}Eu_{0.05}VO_4$, has a particle size in the range between 1 and 15 microns, and exhibits a red cathodoluminescence with principal spectral emission lines at about 6150 A. and 6190 A. These products differ somewhat in brightness. The products of Examples 3 and 5 have a visual brightness of about 65 relative to P1 phosphors as standardized by the Joint Electron Devices Engineering Council. The product of Example 4 has a relative visual brightness of about 58. All of the products have good chemical stability with respect to the processes used commercially for fabricating luminescent screens for color television kinescopes.

Sometimes, the particles are slightly discolored in appearance. This may be caused by a trace of $V_2O_5$ present in the product. This may be minimized by introducing a small excess of $Y_2O_3$ (or $Gd_2O_3$) in preparing the first solution of nitrates prior to coprecipitation and/or by including an excess of $Na_2CO_3$ in the flux added to the dry coprecipitate prior to heating. Examples 1 and 2 include a 5 weight percent excess of $Y_2O_3$ in step 1.

In all embodiments, a chemically pure grade of $V_2O_5$ powder may be used. However, it is preferred to use an acid-washed $V_2O_5$. An acid-washed $V_2O_5$ may be provided, for example, by stirring about 100 grams of chemically pure $V_2O_5$ powder in about 200 cc. of 35 percent nitric acid in water for about 1 hour, then filtering the acid-washed powder, rinsing with water, and then drying.

In all embodiments, gadolinium may be substituted for part or all of the yttrium.

What is claimed is:

A method for preparing a europium-activated yttrium vanadate phosphor comprising:

(1) simultaneously adding to an aqueous solution containing ammonium nitrate, a first solution containing soluble salts of Eu and Y, the molar ratio of Eu/Y being between 2/98 and 9/91 in said first solution, and a second solution containing a soluble vanadate, the molar proportion of added V in the mixed solution being about equal to the molar proportion of added Eu+Y in said mixed solution, each of said solutions being at about 80° C., and higher, thereby producing a coprecipitate of vanadates of Eu and Y, (2) filtering said mixed solution to remove said coprecipitate and then drying said coprecipitate, (3) mixing the dry coprecipitate with a vanadate flux, the weight of said vanadate flux being about 2 to 15 weight percent of the dry coprecipitate, and (4) heating the dry mixture in air at temperatures between 1100 and 1300° C. for between 1 and 4 hours to form said phosphor.

References Cited

UNITED STATES PATENTS 3,152,085  10/1964  Ballman et al. _____ 252—301.4
3,291,747  12/1966  Lefever et al. _____ 252—301.4

OTHER REFERENCES

Mellor: Comprehensive Treatise on Inorganic and Theoretical Chemistry, 1959, vol. 9, p. 775.

TOBIAS E. LEVOW, *Primary Examiner.*

R. D. EDMONDS, *Assistant Examiner.*